United States Patent [19]

Hamilton et al.

[11] 3,920,175

[45] Nov. 18, 1975

[54] METHOD FOR SUPERPLASTIC FORMING OF METALS WITH CONCURRENT DIFFUSION BONDING

[75] Inventors: Charles Howard Hamilton, San Pedro; Leonard A. Ascani, Jr., Palos Verdes Estates, both of Calif.

[73] Assignee: Rockwell International Corporation, El Segundo, Calif.

[22] Filed: Oct. 3, 1974

[21] Appl. No.: 511,900

[52] U.S. Cl. ............... 228/173; 228/193; 228/263
[51] Int. Cl. ............................................. B23k 31/00
[58] Field of Search ............... 29/475, 505, 522; 148/11.5 R; 72/60, 344

[56] References Cited
UNITED STATES PATENTS

| | | | |
|---|---|---|---|
| 2,850,798 | 9/1958 | Bowman | 29/494 |
| 3,044,160 | 7/1962 | Jaffee | 29/498 |
| 3,145,466 | 8/1964 | Feduska | 29/494 |
| 3,170,234 | 2/1965 | Tarr | 29/494 |
| 3,180,022 | 4/1965 | Briggs | 29/492 |
| 3,340,101 | 9/1967 | Fields | 148/11.5 R |
| 3,420,717 | 1/1969 | Fields | 148/11.5 R |
| 3,595,060 | 7/1971 | Hundy | 148/11.5 R |

*Primary Examiner*—Al Lawrence Smith
*Assistant Examiner*—Margaret M. Joyce
*Attorney, Agent, or Firm*—Charles T. Silberberg

[57] ABSTRACT

A method for fabrication of metal structures, especially those with a complex variable thickness form, in which a metal such as a titanium alloy blank is superplastically formed and concurrently diffusion bonded to other metal workpieces to form a desired structure. The metal blank, at least one shaping member, and at least one metal workpiece to be bonded to the metal blank are located within an enclosure. The metal blank and metal workpieces are heated to a suitable forming and bonding temperature and the metal blank stretched substantially in excess of the original surface area under a fluid pressure loading causing it to deform against the shaping member and intimately contact the other metal workpieces for diffusion bonding. An inert gas and/or vacuum environment can be provided in the enclosed area to prevent contamination by air at the elevated temperatures employed.

20 Claims, 9 Drawing Figures

METHOD FOR SUPERPLASTIC FORMING OF METALS WITH CONCURRENT DIFFUSION BONDING

BACKGROUND OF THE INVENTION

The forming of titanium alloys into complex configuration by present day processes for forming parts requiring large tensile elongations, is extremely difficult and in some cases cannot be achieved. Limited tensile elongation, high yield, and moderate modulus of elasticity impose practical limits for ambient temperature forming, and excessive spring-back frequently requires elevated temperature creep sizing. In some parts, forming is done in a 1200° to 1400°F. temperature range to increase the allowable deformation and to minimize spring-back and sizing problems. However, even with the use of these moderately high temperatures, an extremely expensive integrally heated double action forming tool is required. Even with these advanced techniques, forming of titanium alloys is still severely limited and compromises in the design of structural hardware are often necessary with attendant decrease in efficiency and increase in weight.

For many years it has been known that certain metals, such as titanium and many of its alloys, exhibit superplasticity. Superplasticity is the capability of a material to develop unusually high tensile elongations with reduced tendency toward necking. This capability is exhibited by only a few metals and alloys and within limited temperature and strain rate range. Titanium and titanium alloys have been observed to exhibit superplastic characteristics equal to or greater than those of any other metals. With suitable titanium alloys, overall increase in surface areas up to 300 percent are possible.

The advantages of superplastic forming are numerous: very complex shapes and deep drawn parts can be readily formed; low deformation stresses are required to form the metal at the superplastic temperature range, thereby permitting forming of parts under low pressures which minimize tool deformation and wear, allows the use of inexpensive tooling materials, and eliminates creep in a tool; single male or female tools can be used; no spring-back occurs; no Bauschinger effect develops; multiple parts of different geometry can be made during a single operation; very small radii can be formed and no problem with compression buckles or galling are encountered. However, when superplastic forming of titanium and similar reactive metals, it is necessary to heat and form in a controlled environment to ensure cleanliness of the titanium which is particularly sensitive to oxygen, nitrogen, and water vapor content in the air at elevated temperatures. Unless the titanium is protected, it becomes embrittled and its integrity destroyed.

Diffusion bonding refers to the metallurgical joining of surfaces of similar or dissimilar metals by applying heat and pressure for a time duration so as to cause comingling of atoms at the joint interface. Diffusion bonding is accomplished entirely in the solid state at or above on-half the base metal melting point (absolute). Actual times, temperatures, and pressures will vary from metal to metal.

The joining surfaces must be brought within atomic distances by application of pressure. Adequate pressure must also be provided to cause some plastic flow to fill normal void areas. If pressures are too low, small voids will remain at the joint interface and the joint strength will be less than the maximum obtainable. The application of pressure also breaks up the surface oxides and surface asperities so as to present clean surfaces for bonding. The elevated temperatures used for diffusion bonding serve the functions of accelerating diffusion of atoms at the joint interfaces and providing a metal softening which aids in surface deformation so as to allow more intimate contact for atom bonding and movement across the joint interface. The elevated temperature and application of pressure also results in diffusion of the surface contaminants into the base metal during bonding which allows metal atom-to-atom bonding and thereby strengthens the bond. Sufficient time must be allowed to insure the strengthening of the bond by diffusion of atoms across the joint interface. A protective atmosphere for bonding is required when titanium and other similar reactive metals are to be bonded.

The major advantages in diffusion bonding are weight-savings, cost reduction, and the strength of the bond (which can be as strong as the parent metal) as compared to mechanically fastening the workpieces which requires expensive tooling, greater usage of expensive raw materials, and multiple fasteners with their consequent increase in structure, weight, and sources for fatigue cracks.

The processes of superplastic forming of metals and diffusion bonding have individually been disclosed in the prior art. U.S. Pat. No. 3,340,101 to Fields, Jr., et al. discloses a method of superplastic forming where a metal is conditioned to exhibit its effective strain rate sensitivity and then formed by application of vacuum solely or in combination with a male die. Patents relating to solid-state or diffusion bonding include U.S. Pat. No. 3,145,466; 3,180,022; 3,044,160; 2,850,798; and 3,170,234. However, the prior art does not disclose combining these two processes, especially where they are concurrently applied.

The present invention relates generally to a method for concurrently superplastic forming and diffusion bonding a plurality of workpieces to form a desired structure. More specifically, the present invention relates to superplastic forming a metal blank into a desired shape by heating a metal blank and at least one other metal workpiece to a suitable forming and bonding temperature and applying a fluid pressure loading to the metal blank causing it to form against a shaping member and the at least one other metal workpiece while maintaining the coordinated temperature-pressure-time duration conditions for diffusion bonding of the metal blank to the at least one other metal workpiece.

SUMMARY OF THE INVENTION

It is, therefore, an object of the present invention to combine the processes of superplastic forming and diffusion bonding, thereby reducing the time, raw material usage, cost, structure weight, and fatigue weakness in fabricating and mechanically fastening the multiple components of a structure.

It is another object of the present invention to superplastically form a metal blank and concurrently diffusion bond the metal blank to at least one other metal workpiece.

It is yet another object of the present invention to fabricate complex variable thickness structures.

It is still another object of the present invention to heat, superplastically form, and diffusion bond the workpieces in the same apparatus, thereby saving fabrication time and equipment costs.

Briefly, in accordance with the invention, there is provided a method for making a metallic structure from a plurality of workpieces where a sheet metal diaphram is formed about a shaping member and at least one metal workpiece. The diaphram or metal blank, shaping member, and at least one metal workpiece are located in an enclosure. The metal blank is formed under tensile stress by a fluid pressure loading. Heating means are provided to heat the metal blank and at least one metal workpiece to a suitable forming and bonding temperature. The fluid pressure loading and temperature are maintained for a time duration sufficient to produce the bonding between the metal blank workpiece and the at least one metal workpiece.

Other objects and advantages of the invention will become apparent upon reading the following detailed description and upon reference to the drawings.

Figure 1:
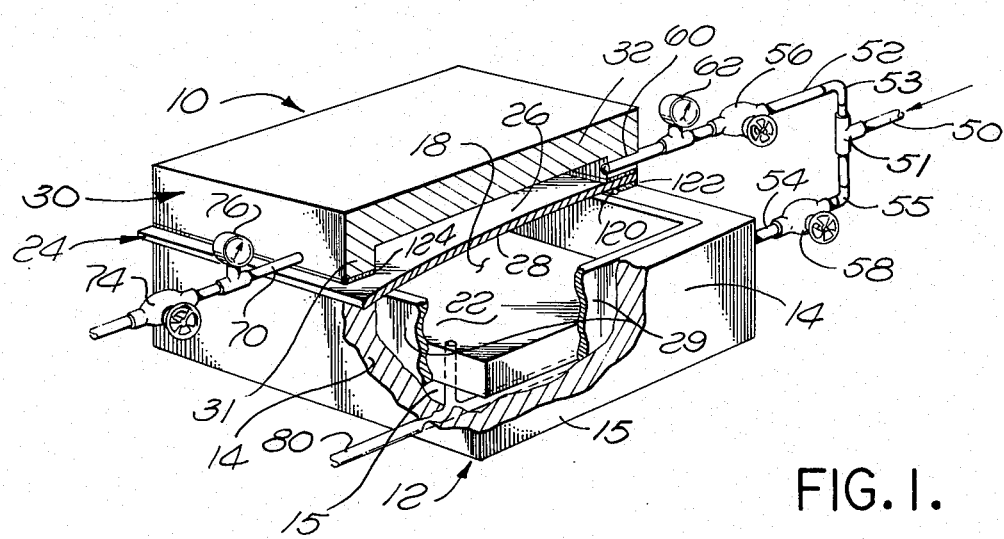
FIG. 1 is a perspective view of a preferred embodiment of the basic forming and bonding apparatus employed in combining superplastic forming and diffusion bonding with portions broken away to show internal details.

While the invention will be described in connection with the preferred embodiment, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

In order for superplastic forming to be successful, it is necessary to use a material that is suitable. The extent to which the material selected will exhibit superplastic properties is predictable in general terms from a determination of the strain rate sensitivity and a design determination of the permissable variation in wall thickness. Strain rate sensitivity can be defined as $m$ where $$m = \frac{d \ln \sigma}{d \ln \dot\epsilon}$$

and $\sigma$ is stress in pounds per square inch and $\dot\epsilon$ is strain rate in reciprocal minutes. Strain rate sensitivity may be determined by a simple and now well recognized torsion test described in the article "Determination of Strain-Hardening Characteristics by Torsion Testing," by D. S. Fields, Jr., and W. A. Backofen, published in the proceedings of the ASTM, 1957, Volume 57, Pages 1259–1272. A strain rate sensitivity of about 0.5 or greater can be expected to produce satisfactory results with the larger the value (to a maximum of 1) the greater the superplastic properties. Maximum strain rate sensitivity in metals is seen to occur, if at all, as metals are deformed near the phase transformation temperature. Accordingly, the temperature immediately below the phase transformation temperature can be expected to produce the greatest strain rate sensitivity. For titanium alloys, the temperature range within which superplasticity can be observed is about 1450°F. to about 1850°F. depending on the specific alloy used.

Other variables have been found to effect strain rate sensitivity and therefore should be considered in selected a suitable metal material. Decreasing grain size results in correspondingly higher values for strain rate sensitivity. Additionally, strain rate and material texture effect the strain rate sensitivity. It has been found that for titanium the $m$-value reaches a peak at an intermediate value of strain rate (approximately $10^{-4}$ in./in./sec.). For maximum stable deformation, superplastic forming should be done at or near this strain rate. Too great a variance from the optimum strain rate may result in loss of superplastic properties.

Diffusion bonding, where separate elements form a single unitary mass therefrom, may be practiced with a wide variety of metals and alloys. However, the quality of the bond and the parameters employed will necessarily vary for each particular choice of workpiece material. Among the metals or alloys which may be joined by solid-state diffusion bonding are aluminum, stainless steel, titanium, nickel, tantalum molybdenum, zirconium, columbium, and beryllium.

The present invention is particularly directed to the reactive metals whose surfaces would be contaminated at the elevated temperatures required for superplastic forming and diffusion bonding. Titanium and its alloys are examples of such metals.

Titanium and its alloys have been found to be particularly well suited for the process of the present invention in that these alloys exhibit very high superplastic properties in a temperature range suitable for diffusion bonding, i.e., 1450°F. to about 1850°F. depending on the specific alloy used. However, the superplastic forming gas pressure typically used is 150 p.s.i., a pressure considerably less than the 2000 p.s.i. used normally in diffusion bonding. Thus, it is likely that the joints produced by diffusion bonding during the superplastic forming process may not develop full parent metal strength, but may rather be more analogous to a high quality braze joint. Such a joint even with strength values less than the parent metal values, nonetheless offers considerable potential for a wide range of applications, particularly where local thickness increases such as pad-ups are required, and primary stresses are parallel to the joint. Additionally, the part can be subjected to a post bond anneal cycle to eliminate micropores and maximize joint strength. In any case, full parent metal strength can be achieved, however, by increasing the forming gas pressure to such a level (as 2000 p.s.i.) that complete diffusion bonding occurs. These pressures can be imposed at or near completion of the forming cycle without impairing the superplastic forming.

Figure 2:
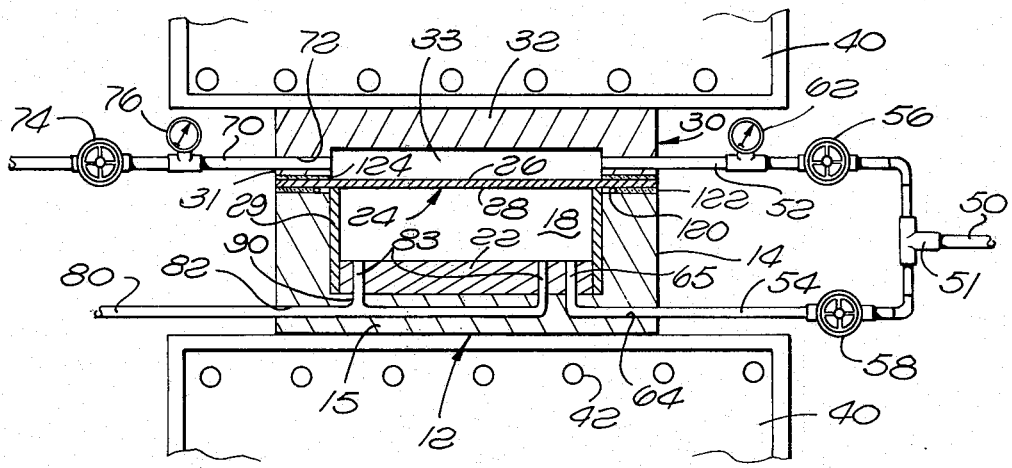
FIG. 2 is a cross-sectional elevational view of the apparatus shown in FIG. 1 mounted between heating platens of a press.

Turning first to FIGS. 1 and 2, there is shown an example of the forming and bonding apparatus generally indicated at 10 for carrying out the invention. Lower tooling 12 has side walls 14 in the form of a ring which can be of any desired shape and a preferably integral base plate 15. The inner surface of lower tooling 12 defines an inner chamber 18 and a female die surface or shaping member. One or more male die members 22 can be provided in chamber 18 to vary the shape of the part to be formed.

Metal blank 24, preferably in the form of a sheet having upper and lower opposed principle surfaces 26 and 28 respectively, is supported on tooling frame 12 and covers chamber 18. Any metal blank that exhibits superplastic properties within the temperature range required for diffusion bonding can be used, but the present invention is particularly concerned with such metals that are subject to contamination at forming temperature, such as titanium or an alloy thereof such as Ti-6A1-4V. The initial thickness of diaphragm 24 is determined by the dimensions of the part to be formed.

Within chamber 18 is placed one or more metal workpieces 29 which constitute the part details to which the formed metal blank 24 must join. The details 29 are of such a shape and positioned so that the desired final structure will result when the formed diaphragm 24 is completely bonded to the details 29. The part details 29 can be any desired shape or material, provided that it is subject to being diffusion bonded to the metal blank 24 within the desired temperature range. As illustrated, only one part detail 29 in the form of a rectangular ring which surrounds die 22 is used. The material for the part details 29 is not required to be superplastic as it is just being bonded to the metal blank 24 rather than formed. It should also be noted that different materials for the part details 29 and the metal blank 24 may be used, although the joint strength would be expected to vary depending on the combination of materials used.

A primary consideration in the selection of a suitable shaping member alloy is reactivity with the metal blank 24 to be formed and the part details 29 at the forming and bonding temperature. When the metal blank 24 and part details 29 are titanium or an alloy thereof, iron base alloys with low nickel content and modest carbon content (as 0.2 to 0.5 percent carbon) have been successful. Since forming loads are very low, materials with low creep strength and mechanical properties can often be used. As an additional or alternative provision to prevent the bonding of the workpieces to the shaping members, a suitable stop-off such as graphite or boron nitride can be employed on the shaping member surfaces.

Upper tooling frame 30 preferably has the same plan area shape as lower tooling frame 12 so that the side walls 31 which are preferably integral with top plate 32 are in alignment with the side walls 14 of lower tooling 12. Upper tooling frame 30 defines a chamber 33 that is closed by diaphragm 24.

The weight of upper tooling frame 30 acts as a clamping means for the metal diaphragm 24. A single continuous edge of the diaphragm 24 is effectively constrained between the upper support tooling frame 30 and the lower support tooling frame 12. This insures that the diaphragm 24 will be stretched rather than drawn. Should it be desired, additional tightening means such as bolts (not shown) can be employed to more effectively constrain the diaphragm 24. As shown in FIG. 2, an additional tightening means employed is a hydraulic press (not shown) having platens 40. The forming and bonding apparatus 10 is placed between platens 40 and compressed thereby assuring that diaphragm 24 is effectively constrained and the chambers sealed from the air. This arrangement is particularly advantageous as the platens can be made of ceramic material and resistance heated wires 42 can be provided in the platens 40 for heating chambers 18 and 33 to the forming and bonding temperature. Heat from the resistance wires 42 is transmitted through tooling frame 12 and 30 to the enclosed chambers 18 and 33 and consequently to the metal blank 24 and part details 29. Other heating methods could be used with the forming and bonding apparatus 10 ordinarily surrounded by a heating means if the heating platens are not used.

For contamination prevention of metal diaphragm 24 and part details 29 while heating, forming, and bonding, an environmental control system is provided. The purpose of the system is to expose the metal diaphragm 24 and part details 29 only to inert gas or vacuum while heating, forming, and bonding. The metal diaphragm 24 and part details 29 will not react with the inert gas due to the nature of the inert gas, even at elevated forming and bonding temperatures. In a high vacuum, there are substantially no elements for the diaphragm 24 to react with. Thus, in this environment, contamination of the metal diaphragm 24 will be prevented. Line 50 is connected to a source of pressurized inert gas at one end (not shown) and into a T-junction member 51 at the other end. The inert gas used is preferably argon in liquid form. Member 51 is connected to two parallel lines 52 and 54 by elbow joints 53 and 55. Line 52 is connected through an orifice 60 in upper tooling frame 30 to chamber 33. For governing the flow of inert gas through line 52 into chamber 33, a valve 56 is mounted in line 52. A pressure gauge 62 is also provided in line 52 to indicate up-stream pressure. Line 54 is connected to chamber 18 through a channel 64 in lower tooling frame 12 and an aligned orifice 65 through male-shaping member 22. A valve 58 is connected in the line 54 for regulating flow of inert gas into chamber 18. Line 70, which is connected to the opposite side of upper tooling frame 30, through orifice 72 functions as an outlet for inert gas from chamber 33. A valve 74 is provided in line 70 to govern flow of inert gas through the outlet. A pressure gauge 76 is also connected in line 70 to provide an indication of pressure downstream. Line 80 functions as either an inert gas vent or a vacuum inlet. Line 80 is connected to chamber 18 through channel 82 and transverse orifices 90 in frame 12 and orifices 83 in male die member 22 which are aligned with orifices 90. If line 80 functions as a vacuum inlet, a suction pump (not shown) would be employed in line 80 for creating the vacuum in chamber 18.

Forming of the diaphram 24 is produced by the pressure differential between chambers 18 and 33. The pressure loading can be accomplished in a variety of ways. For example, a constant positive pressure can be maintained in chamber 33 while a vacuum is applied to chamber 18, or positive pressure in chamber 32 can be increased to greater than the positive pressure in chamber 18, or positive pressure in chamber 33 could be increased at the same time a vacuum is applied to chamber 18. By using the metal blank 24 as a diaphram which divides the two pressure chambers, forming time can be reduced because the vacuum can be applied to one chamber and positive pressure to the other. This allows increase of the pressure differential which increases the strain rate. This is very significant with a thick diaphram. However, the usable strain rate should not be exceeded.

Figure 3:
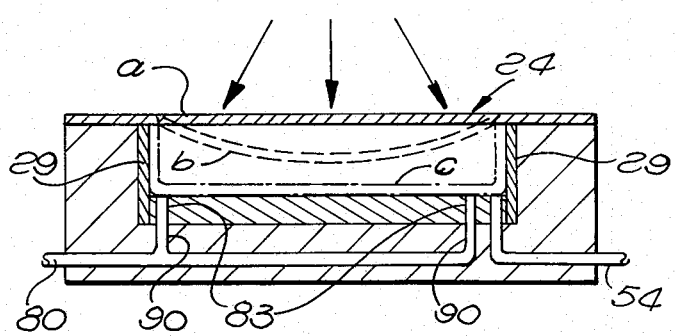
FIG. 3 is a cross-sectional elevational view of a portion of the forming apparatus below the metal diaphram illustrating the original position of the metal to be formed, an intermediate position, and the final position of the metal as formed.

FIG. 3 illustrates the forming of the metal diaphram 24 and its bonding to part detail 29. The original position of the diaphram is shown at a, an intermediate position at b, and the final position of the metal diaphram as formed at c. During forming, the pressure above the diaphram 24 in chamber 33 is greater than that below the diaphram 24 in chamber 18. As the metal diaphram 24 deforms due to the pressure differential, it contacts the part detail 29 and forces inert gas in chamber 18 through vent line 80. The pressure causing the superplastic forming also meets the diffusion bonding requirement of holding the metals to be joined under pressure. The pressure and forming temperature would be maintained for a time duration suitable for diffusion bonding to take place which may include a period of time after the superplastic forming had been completed. The differential pressure used could vary from 15 p.s.i. to more than 2000 p.s.i., however, care must be taken in the rate of pressurization to ensure that the diaphram 24 maintains its superplasticity so as to prevent necking or fracture. For this reason and to insure sufficient pressure for diffusion bonding, the differential pressures normally used are increased gradually. Forming times, depending on diaphram thickness and differential pressure, may vary from 30 minutes to 12 hours.

As can best be seen in FIG. 1, there is shown an example of a sealing method for sealing chambers 18 and 33. This sealing method is optional in that the forming apparatus 10 is sealed by compression from the weight of upper tooling frame 30 and/or pressure from a press, and/or a clamping means. However, especially when a vacuum is used, it is desirable to have very effective sealing to prevent entrance into chambers 18 and 33 of any contaminating air. Such contamination, if minimal, results in extra labor in cleaning the surface of the formed part, and if more than minimal, may result in the formed part being unsatisfactory for use. The technique illustrated in FIG. 1 uses a pure titanium O-ring 120 which can be combined with an elevated temperature glass base type sealant 122 such as Markel CRT-22 glass-coated sealant, both of which overlie the periphery of the top of the side-wall 14 of frame 12. The elevated temperature sealant can also be placed on the bottom of upper tooling frame 30 around the periphery as shown at 124 in contact with the diaphram 24. The titanium O-ring is extremely soft at forming temperatures and therefore effects a very good seal.

Figure 4:
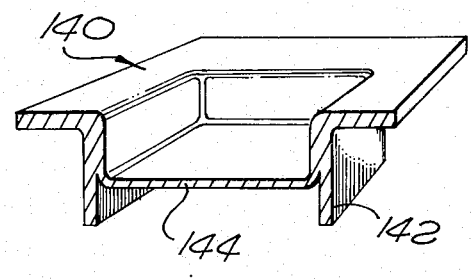
FIG. 4 is a perspective view partially in cross-section of the combined superplastically formed diffusion bonded structure of FIG. 3.

Referring now to FIG. 4 there is shown the final formed and bonded structure of FIG. 3. Such a structure has been fabricated by Applicants' according to this present invention using 1,700°F. and a pressure differential of 60 p.s.i. for a total time duration of approximately 3 hours. As can be seen, the structure is unitary rather than a plurality of parts mechanically fastened. The structure is of a complex shape with a variable thickness. The structure 140 has its greatest thickness at the sides 142 where bonded, an intermediate thickness at the lower unbonded portions of sides 142, and its thinnest portions at the receptical base 144 of the structure. Such a structure 140 could not be fabricated by superplastic forming alone because of the variable thickness. Also, a great deal of time and expense is saved by accomplishing both superplastic forming and diffusion bonding using only one apparatus and one process.

Referring now to FIGS. 5, 6, 7, 8, and 9, there are shown five different arrangements of part details and shaping members for acquiring different final structures. Lines 95 and 96 through channels 97 and 98 vent chambers 18 when the diaphram is forming. The original position of the metal diaphram to be formed is shown in broken lines at a, and the final position of the diaphram 24 as formed and bonded to the part details 150, 152, 154, 156, and 158 respectively at b.

Figure 5:
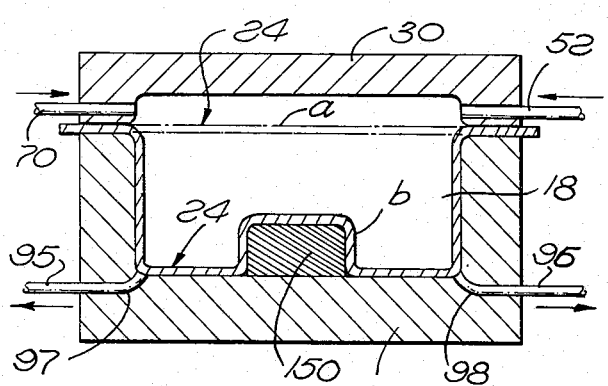
FIGS. 5, 6, 7, 8 and 9 are cross-sectional elevational views of the preferred forming apparatus as modified for forming different shaped final structures illustrating the original position of the metal diaphram to be formed in broken lines and the final position of the diaphram as formed and bonded to at least one other metal workpiece in solid lines.
Figure 6:
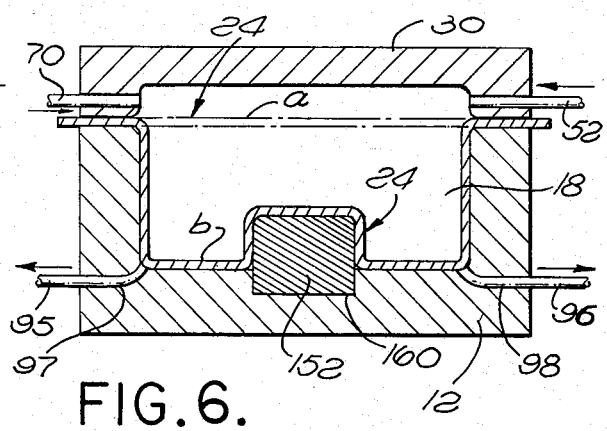
Figure 7:
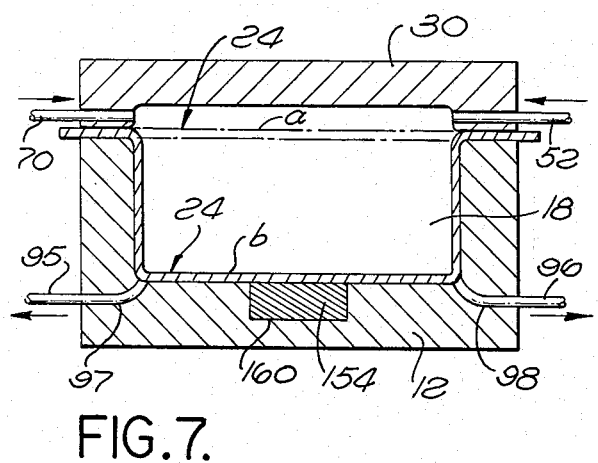

The configurations shown in FIGS. 5, 6, and 7 are fabricated in a female tooling assembly. In each case the part detail 150, 152, and 154 is a solid rectangular block. In FIGS. 5 and 6, the part details 150 and 152 act as a male die for forming the diaphram 24 into a hat configuration with the insert bonded thereto as shown. As shown in FIG. 6, the bottom frame 12 can be provided with an internal central groove 160 so that insert 152 would protrude from the bottom of the hat section when the structure is formed. In FIG. 7, the insert 154 does not project above the top of groove 160, and therefore, the diaphram 24 is formed against only a female die surface of which the top of insert 154 forms a part.

Figure 8:
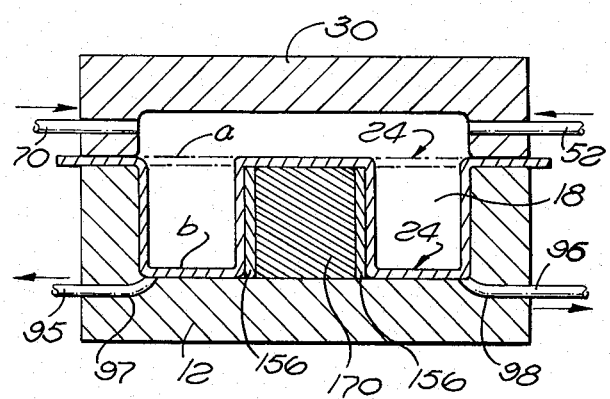
Figure 9:
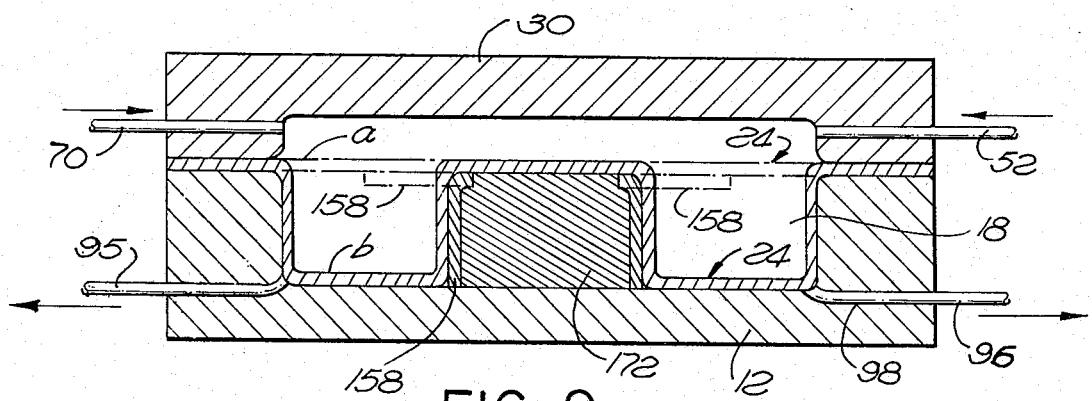

The configurations of FIG. 8 and FIG. 9 are obtained using male dies 170 and 172 respectively, along with the female die internal surface of lower tooling frame 12. In FIG. 8 the two inserts 156 are placed on either longitudinal side of the male die 170 before forming. The final hat section as formed will then have a hollow interior corresponding to the male die 170 and longitudinal sides that are thicker than the top of the hat structure. In FIG. 9 the two inserts 158 are placed parallel to and and in contact with the diaphram 24 while supported on the male die 172. When diaphram 24 deforms due to the differential pressure, it also forms the details 158 against the male die 172 while concurrently bonding the details 158 to diaphram 24. For this operation, the material for the part details 158 should also be superplastic at the temperature used for the process. By forming in this manner, the upper corners of the hat section are in addition to the longitudinal sides thicker and therefore reinforced.

Figure 10:
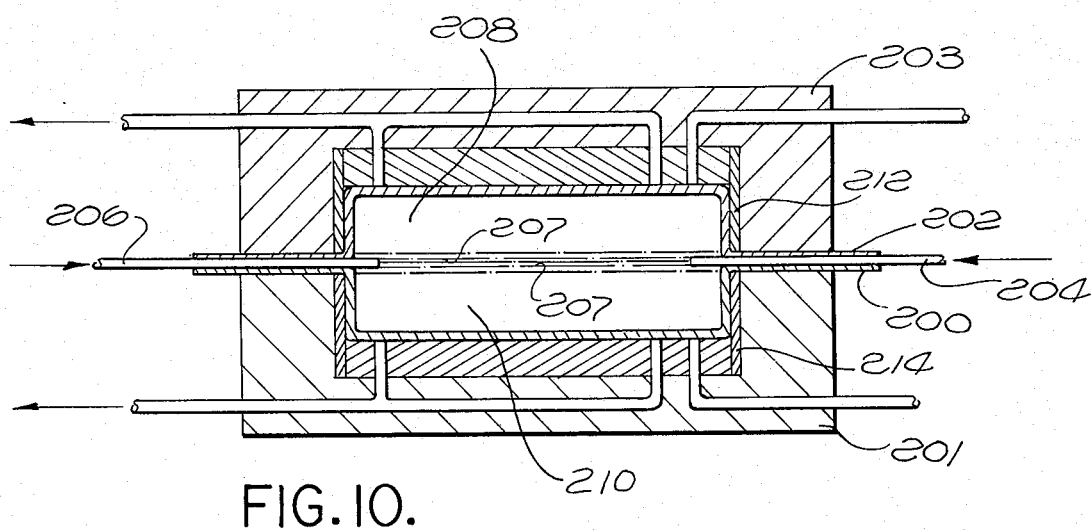
FIG. 10 is a cross-sectional elevated view of a modified forming apparatus utilizing two metal diaphrams illustrating their original positions in broken lines and their final positions as formed and bonded in solid lines.
Figure 11:
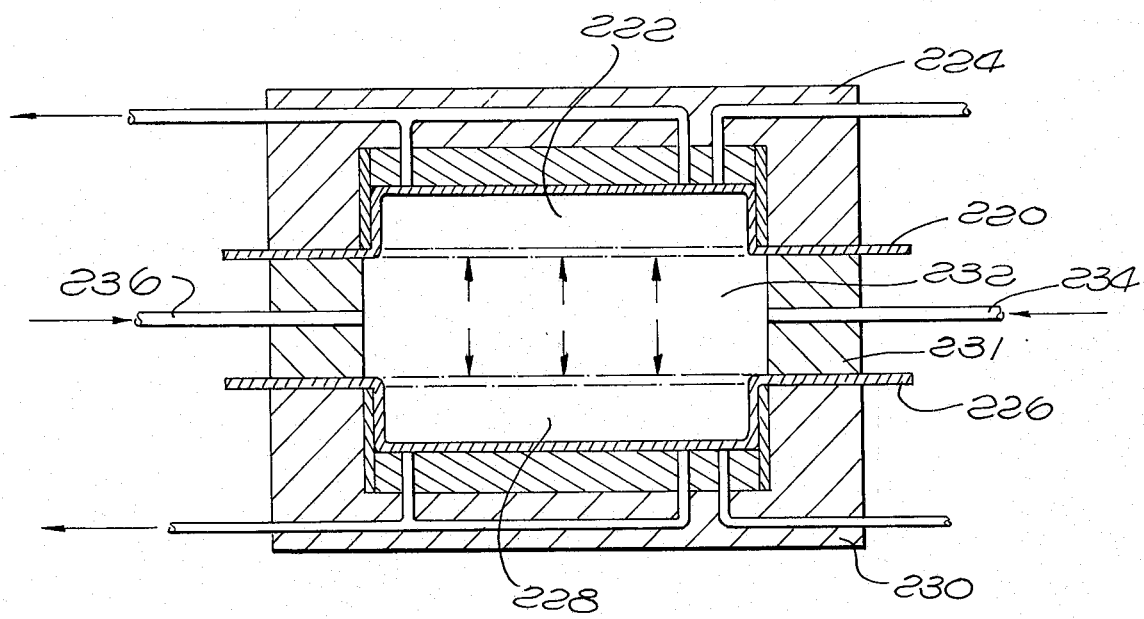
FIG. 11 is a cross-sectional elevational view of another modified forming apparatus utilizing two metal diaphrams illustrating their original positions in broken lines and their final positions as formed and bonded in solid lines.

FIGS. 10 and 11 illustrate modifications of the basic forming apparatus for the forming of two diaphrams. In FIG. 10 metal blank 200 is positioned over support tooling frame 201 and covers chamber 210. Another metal blank 202, preferably with the same plan area as diaphram 200, is positioned over and in alignment with diaphram 200 and covers chamber 208 defined by the inner surface of upper tooling frame 203. Expansion tubes 204 and 206 are positioned between the two metal blanks. In order to prevent compression of tubes 204 and 206 by the tooling frames, the blanks 200 and 202 can be provided with aligned grooves 207 in which the tubes 204 and 206 would be located. Pressurized inert gas flows through the lines 204 and 206 while optimally a vacuum is applied to chambers 208 and 210 for forming the structure. Blank 200 forms in chamber 210 and concurrently bonds to part detail 214 while blank 202 forms in chamber 208 and concurrently bonds to part detail 212. The edges of blanks 200 and 202 that are constrained by the upper and lower tooling are also diffusion bonded during this process by virtue of the temperature of the process and the sealing pressure (the weight of upper tooling 203 and optionally pressure from a press and/or a clamping means). A hollow final structure results.

FIG. 11 illustrates a forming apparatus for forming two individual final structures concurrently. A metal blank 220 covers a chamber 222 defined by upper tooling 224 while a metal blank 226 covers chamber 228 of lower tooling 230. An intermediate tooling ring 231, preferably of the same plan area shape as the upper and lower tooling, spaces diaphrams 220 and 226 and with those diaphrams defines chamber 232. Inflation lines 234 and 236 allow flow of inert gas into chamber 232 which acts to force blank 220 into chamber 222 and blank 226 into chamber 228. Vacuum could also be applied to chambers 222 and 228 to increase the pressure differential.

OPERATION

Referring to FIGS. 1 and 2 lower tooling frame 12 and associated lines 54 and 80 are assembled. Sealing means such as sealer 122 and O-ring 120 are applied to lower frame 12 if desired. Shaping member 22 is positioned inside frame 12. Part detail 29 is placed in chamber 18 surrounding male shaping member 22. A suitable metal blank 24 is placed over the frame 12 enclosing chamber 18. Optionally sealant can be placed on the bottom of upper frame 30. Upper frame 30 with connected gas lines 70 and 52 is placed over the metal blank 24 enclosing chamber 33. The entire forming apparatus 10 is placed inside a press with heated top and bottom ceramic platens 40. Pressure is applied by the press on the forming apparatus 10 for an effective seal. Inert gas is applied to both upper and lower chambers, 33 and 18, respectively, to protect the metal blank 24 and part detail 29 from contamination during heating, forming, and bonding. The temperature inside chambers 33 and 18 is raised by the heating apparatus 42 in platens 40 to a suitable forming and bonding temperature. The pressure differential across the principal surfaces of the metal blank 24 causes the metal blank 24 to form against shaping member 22 and part detail 29. The pressure differential can be generated by a vacuum in lower chamber 18, increased gas pressure in upper chamber 33, or both. The temperature and pressure conditions are maintained until the blank 24 is formed and bonded to the part detail 29. The temperature in heating platens 40 is reduced and the formed and bonded structure cooled with the inert gas atmosphere (or vacuum) retained though reduced. The press is raised, the forming and bonding apparatus 10 disassembled, and the structure removed and trimmed to size.

Thus, it is apparent that there has been provided, in accordance with the invention, a method for superplastic forming of metals with concurrent diffusion bonding that fully satisfies the objectives, aims, and advantages set forth above. While the invention has been described in conjunction with specific embodiments thereof, it is evident that many alternatives, modifications, and variations, will be apparent to those skilled in the art in light of the foregoing description. Accordingly, it is intended to embrace all such alternatives, modifications, and the variations as fall within the spirit and scope of the appended claims.

We claim:
1. A method of making a metallic structure from a plurality of workpieces comprising:
   providing at least one shaping member;
   providing a metal blank workpiece having an effective strain rate sensitivity and two opposed principal surfaces;
   providing at least one metal workpiece to be bonded to said metal blank;
   enclosing an area around said metal blank, said at least one shaping member, and said at least one metal workpiece;
   heating said metal blank and said at least one metal workpiece to a temperature suitable for forming said metal blank and sufficient to produce bonding of said metal blank to said at least one metal workpiece under coordinated temperature-pressure-time duration conditions;
   inducing tensile stress in said metal blank by applying a pressure loading across said principal surfaces thereof, causing said metal blank to deform against, and into intimate contact with said at least one shaping member and said at least one metal workpiece; and
   maintaining said pressure loading and said temperature for a time duration sufficient to produce bonding between said metal blank workpiece and said at least one metal workpiece.

2. A method of making a metallic structure in a controlled environment from a plurality of workpieces comprising:
   providing at least one shaping member;
   providing a metal blank workpiece having an effective strain rate sensitivity and two opposed principal surfaces;
   providing at least one metal workpiece to be diffusion bonded to said metal blank;
   enclosing an area around said metal blank, said at least one shaping member, and said at least one metal workpiece;
   providing an inert gas environment in said enclosed area;
   heating said metal blank and said at least one metal workpiece to a temperature suitable for superplastic forming said metal blank and sufficient to produce diffusion bonding of said metal blank to said at least one metal workpiece under coordinated temperature-pressure-time duration conditions;
   inducing tensile stress in said metal blank by applying a fluid pressure loading across said principal surfaces thereof, causing said metal blank to deform against and into intimate contact with said at least one shaping member and said at least one metal workpiece; and
   maintaining said fluid pressure loading and said temperature for a time duration sufficient to produce diffusion bonding between said metal blank workpiece and said at least one metal workpiece.

3. The method as defined in claim 2 also including locating said metal blank with respect to said shaping member by positioning said metal blank with its principal opposed surfaces in operative projection with respect to said at least one shaping member.

4. The method as defined in claim 3 wherein said fluid pressure loading across said principal surfaces is applied for a substantial period of time inversely related to the induced tensile stress and said metal blank is stretched substantially in excess of its original surface area.

5. A method as defined in claim 4 wherein said enclosed area is divided into first and second chambers by said metal blank, and said at least one shaping member and said at least one metal workpiece are located in said first chamber.

6. The method as defined in claim 5 wherein said fluid pressure loading comprises a greater pressure of inert gas in said second chamber relative to said first chamber and said first chamber is vented to allow for efflux of inert gas as said metal blank deforms and thereby reduces the size of said first chamber.

7. The method as defined in claim 5 wherein said fluid pressure loading comprises application of vacuum to said first chamber while maintaining a constant pressure of inert gas in said second chamber.

8. The method as defined in claim 5 wherein said fluid pressure loading comprises application of vacuum to said first chamber and increased pressure of inert gas in said second chamber.

9. The method of claim 5 wherein said inert gas is argon, said metal blank is titanium alloy sheet, and said at least one metal workpiece is titanium alloy.

10. The method as defined in claim 5 also including sealing said enclosed area to prevent influx of air into said enclosed area.

11. The method as defined in claim 5 wherein said at least one shaping member is a female die.

12. The method as set out in claim 5 wherein said at least one shaping member comprises a female die and at least one male die.

13. The method as set out in claim 5 wherein said at least one shaping member is at least one male die.

14. The method as set out in claim 5 also including positioning said at least one metal workpiece parallel to and in contact with said metal blank prior to forming.

15. The method as set out in claim 5 also including positioning said at least one metal workpiece normal to and spaced from said metal blank prior to forming.

16. The method as set out in claim 5 also including positioning said at least one metal workpiece normal to and in contact with said metal blank prior to forming.

17. The method as set out in claim 5 wherein said first chamber has a wall with at least one groove therein and said at least one metal workpiece is located in said at least one groove.

18. The method as set out in claim 5 also including after the step of maintaining said fluid pressure loading the additional step of increasing said fluid pressure loading to insure complete diffusion bonding.

19. A method of making a metallic structure from a plurality of workpieces comprising:
providing at least two shaping members;
providing two metal blank workpieces having an effective strain rate sensitivity and each having two opposed principal surfaces, said metal blanks being positioned parallel to and in contact with each other and with a principal surface of one metal blank overlying a principal surface of the other metal blank;
providing at least one metal workpiece to be bonded to at least one of said metal blanks;
enclosing an area around said metal blanks said at least two shaping members, and said at least one metal workpiece;
effectively constraining a periphery of each of said metal blanks by application of pressure,
circumscribing a surface portion of each of said metal blanks;
heating said metal blanks and said at least one metal workpiece to a temperature suitable for forming said metal blanks and sufficient to produce bonding of said constrained peripheries of said metal blanks to one another and bonding of at least one of said metal blanks to said at least one metal workpiece under coordinated temperature-pressure-time duration conditions;
inducing tensile stress in the circumscribed portions of said metal blanks by applying a fluid pressure loading across said principal surfaces thereof, causing the circumscribed portions of said metal blanks to deform in approximately opposite directions, against, and into intimate contact with, said at least two shaping members and the circumscribed portion of at least one of said metal blanks against, and into intimate contact with, said at least one metal workpiece; and
maintaining said fluid pressure loading and said temperature for a time duration sufficient to produce bonding between said at least one metal blank workpiece and said at least one metal workpiece.

20. A method of making metallic structures from a plurality of workpieces comprising:
providing at least two shaping members;
providing two metal blank workpieces having an effective strain rate sensitivity and each having two opposed principal surfaces, said metal blanks being positioned in spaced relationship to one another;
providing at least one metal workpiece to be bonded to at least one of said metal blanks;
enclosing an area around said metal blanks, said at least two shaping members, and said at least one metal workpiece;
heating said metal blanks and said at least one metal workpiece to a temperature suitable for forming said metal blanks and sufficient to produce bonding of at least one of said metal blanks to said at least one metal workpiece under coordinated temperature-pressure-time duration conditions;
inducing tensile stress in said metal blanks by applying a fluid pressure loading across said principal surfaces thereof, causing said metal blanks to deform in approximately opposite directions, against, and into intimate contact with said at least two shaping members, and at least one of said metal blanks against, and into contact with, said at least one metal workpiece; and
maintaining said fluid pressure loading and said temperature for a time duration sufficient to produce bonding between said at least one metal blank workpiece and said at least one metal workpiece.

* * * * *